United States Patent
McVay et al.

(10) Patent No.: US 10,808,144 B2
(45) Date of Patent: Oct. 20, 2020

(54) POLYOLEFIN SILICON COATING COMPOSITION

(71) Applicant: PPG Industries Ohio, Inc., Cleveland, OH (US)

(72) Inventors: Robert McVay, Cincinnati, OH (US); Christopher L. Most, Wilder, KY (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/601,346

(22) Filed: May 22, 2017

(65) Prior Publication Data

US 2018/0334544 A1 Nov. 22, 2018

(51) Int. Cl.

| | | |
|---|---|---|
| *C09D 183/04* | (2006.01) | |
| *C09D 123/08* | (2006.01) | |
| *C09D 7/65* | (2018.01) | |
| *C09D 7/41* | (2018.01) | |
| *C08K 5/05* | (2006.01) | |

(52) U.S. Cl.
CPC ............. *C09D 183/04* (2013.01); *C09D 7/41* (2018.01); *C09D 7/65* (2018.01); *C09D 123/08* (2013.01); *C08J 2323/08* (2013.01); *C08K 5/05* (2013.01); *C08L 2666/02* (2013.01)

(58) Field of Classification Search
USPC .................................................. 525/100–106
See application file for complete search history.

(56) References Cited

U.S. PATENT DOCUMENTS

| | | |
|---|---|---|
| 6,410,123 B1 | 6/2002 | Otani et al. |
| 7,803,865 B2 | 9/2010 | Moncla et al. |
| 8,063,128 B2 | 11/2011 | Moncla et al. |
| 8,349,929 B2 | 1/2013 | Kainz et al. |
| 9,416,291 B2 | 8/2016 | Wilbur et al. |
| 2004/0209089 A1 | 10/2004 | Liu et al. |
| 2007/0134502 A1* | 6/2007 | Fonda .................. C09D 175/06 428/447 |
| 2011/0124791 A1* | 5/2011 | Sultan ..................... C08L 23/08 524/425 |
| 2011/0281984 A1* | 11/2011 | Garois .................... C08L 77/00 524/168 |
| 2014/0023782 A1* | 1/2014 | Kunz ............... C09D 123/0869 427/239 |
| 2014/0162005 A1* | 6/2014 | Most ....................... C08L 33/08 428/35.8 |
| 2015/0147501 A1* | 5/2015 | Lindenmuth .......... C08K 5/005 428/35.7 |
| 2016/0208084 A1* | 7/2016 | Hrachova ............... C08L 23/12 |
| 2016/0244629 A1 | 8/2016 | Xu et al. |

FOREIGN PATENT DOCUMENTS

WO 02088247 A2 11/2002

OTHER PUBLICATIONS

Yilgor, Iskender et al., "Modification of Polyolefins with Silicone Copolymers. I. Processing Behavior and Surface Characterization of PP and HDPE Blended with Silicone Copolymers", Journal of Applied Polymer Science; Mar. 12, 2001; pp. 1625-1634; vol. 83 (2002); John Wiley & Sons, Inc.

Dow Corning, "Elevate Thermoplastic Performance and Processing", Dow Corning Website.

Qmed, "SILEFIN—The connection between SILicone and polyolEFIN", Qmed Website.

* cited by examiner

*Primary Examiner* — Marc S Zimmer
(74) *Attorney, Agent, or Firm* — Diane R. Meyers

(57) ABSTRACT

A coating composition comprising a polyolefin component and a silicon component, wherein the composition comprises 5.0 wt % or greater silicon-containing material, based on total solid weight of the composition, is disclosed. Substrates coated at least in part with such a coating composition, including packages such as metal cans, are also disclosed.

22 Claims, No Drawings

POLYOLEFIN SILICON COATING COMPOSITION

FIELD OF THE INVENTION

The present invention is directed to coating compositions comprising a polyolefin component and a silicon component. Substrates, including packages, coated at least in part with such a coating composition are also within the scope of the present invention.

BACKGROUND OF THE INVENTION

The application of various polymeric coatings to metallic substrates, including metal cans such as food, beverage and cosmetic containers, to retard or inhibit corrosion is well established. Coatings are applied to the interior of such containers to prevent the contents from contacting the metal of the container. Contact between the metal and the food, beverage or cosmetic can lead to corrosion of the metal container, which can then contaminate the product. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. A reduced use of formaldehyde in coatings is also desired. Coating compositions having reduced levels of these and other undesirable components while still providing commercially acceptable performance results, such as on or more of those described above, are also desired.

SUMMARY OF THE INVENTION

The present invention is directed to a coating composition comprising a polyolefin component and a silicon component, wherein the composition comprises 5.0 wt % or greater silicon-containing material, where wt % is based on the total solids weight of the composition.

Substrates coated at least in part with such a coating are also within the scope of the invention.

DETAILED DESCRIPTION OF THE INVENTION

The present invention is directed to a coating composition comprising a polyolefin component and a silicon component. A silicon-containing material is present in an amount of 5.0 wt % or greater, with wt % based on the total solids weight of the coating composition. The silicon-containing material may be present in an amount of greater than 5.0 wt %, with wt % based on the total solids weight of the coating composition.

The polyolefin component comprises one or more polyolefin materials. Any suitable polyolefin can be used. A "polyolefin" will be understood as referring to a polymer derived from the polymerization of at least one olefinic hydrocarbon; that is, a hydrocarbon containing a carbon-carbon double bond. Examples of suitable polyolefins include, but are not limited to, homopolymers and copolymers (including elastomers) of one or more olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, such as ethylene-butadiene copolymer and ethylene-ethylidene norbornene copolymer; and polyolefins (including elastomers) such as copolymers of two or more alpha-olefins with a conjugated or non-conjugated diene, examples of which include ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer. Any of the above polyolefins can contain functionality, such as hydroxyl, amine, aldehyde, epoxide, ethoxylate, acid, and/or ester groups. Particularly suitable functionality is acid functionality. The polyolefin component may thus comprise one or more acid-functional polyolefins. Acid functionality can be derived by copolymerization of one or more ethylnically unsaturated monomers having one more acidic functional groups such as carboxyl groups. Non-limiting acid functional ethylenically unsaturated monomers include, for example, methacrylic acid and acrylic acid. Accordingly, the polyolefin component may comprise an acrylic resin, obtainable by copolymerization of at least one or more olefin monomers with (meth)acrylic acid and/or derivatives thereof such as (meth)acrylate monomers. As used herein, the terms "(meth)acrylic acid", "(meth)acrylate" and the like refer collectively to arylic acid and methacrylic acid, or acrylates and methacrylates, respectively. An example of an acid functional polyolefin is an ethylene acrylic acid copolymer. Such copolymer is commercially available from Dow in its PRIMACOR line. The acid functionality may render the polyolefin dispersible or dissolvable in a carrier medium such as water. The acid functional polyolefin may be at least partially neutralized with a base such as an amine for promoting dispersion or dissolution.

The polyolefin can be included in the composition according to the present invention in any form. For example, the polyolefin can be in the form of a dispersion. A polyolefin dispersion can be prepared by melting the polyolefin above its melt point in a vessel capable of holding pressures necessary to add carrier medium (such as water in the presence of a base, such as an amine) while mixing at elevated temperatures. Suitable polyolefin dispersions are also commercially available from Dow Chemical as Generic Polyolefin Dispersion TYPE 1 5453. The polyolefin used according to the present invention can also be used in solution form. An example of this is an acid containing polyolefin, such as PRIMACOR 5980I commercially available from Dow Chemical. PRIMACOR can be heated in the presence of water and amine, such as enough amine to achieve a level of neutralization that will allow formation of the solution.

The molecular weight of the at least one polyolefin used in the polyolefin component of the present invention can be 5,000 or greater, such as 6,500 or greater or 7,500 or greater, and can be 20,000 or less, such as 15,000 or less or 10,000 or less. The molecular weight can be 18,000 to 5,000, for example. Molecular weight as reported herein is the weight average molecular weight as measured by GPC using a polystyrene standard ("Mw").

The amount of polyolefin component in the coating composition can be 5 wt % or greater, such as 10 wt % or greater, 20 wt % or greater, 25 wt % or greater or 40 wt % or greater, based on total solid weight of the composition. The amount of polyolefin component in the coating composition can be 95 wt % or lower, such as 75 wt % or lower or 50 wt % or lower, with wt % based on total solid weight of the composition. The amount of polyolefin component in the coating composition can be within any of the above limit values such as in a range of 5 wt % to 95 wt %, 25 wt % to 95 wt %, or 40 wt % to 95 wt % based on total solid weight of the composition.

The silicon component may comprise any silicon-containing material. As used herein, "silicon-containing material" means any species or reactant containing one or more silicon atoms. The material can be inorganic and can be, for example, monomeric or polymeric. The silicon-containing material can comprise, for example, a silicone, such as a silicone resin, or a silane. The silicone-containing material can be, for example, an organofunctional silicon; that is, a silicon-containing compound with one or more organic substituents. Combinations of silicon-containing materials may also be used. The silicon-containing material may be selected so as to react with the other coating components, and/or to self-condense. Such self condensation may increase the integrity of the film resulting from the coating composition upon cure. It will be appreciated that the "silicon component" may contain material in addition to the silicon-containing material, including solvents, dispersing media, and the like.

Any suitable silicone can be used in the silicon-containing material. A silicone, or silicone resin, refers to a compound having a polysiloxane (alternating Si—O) backbone with optional organic substituents. Particularly suitable are silsesquioxane resins, including silanol functional silsesquioxanes as well as silane modified silsesquioxanes, and functionalized silicones including silane modified silicones. Suitable silicone resins, including silanol functional silsesquioxanes, are commercially available from Dow Chemical in their RSN line. RSN 217, for example, is a fully phenylated silanol functional silsesquioxane and with a degree of substitution of 1.0. RSN 233, for example, is a silanol functional silsesquioxane with a phenyl to methyl ratio of 1.3:1 and a degree of substitution of 1.15. RSN 255, for example, is also a silanol functional silsesquioxane with a phenyl to methyl ratio of 0.84:1 and a degree of substitution of 1.05. All of these values are as reported by the manufacturer, Dow. The silicone can be added in any of one or more different forms to the coating composition. For example, the silicone may be in a water based solution prior to addition to the composition. The silicone can also be added as a dry ingredient. The average particle size of silicone can vary quite considerably according to the present invention and can be, for example, from 1 nm up to less than 5 nm; particularly useful particle sizes range from 0.5 μm to a coarse 20 μm. The silicone may also be ground into a fine powder prior to addition to the coating composition. For example, the silicone powder or flake might be ground so as to have an average particle size of <5 microns. The silicone can be a polysiloxane and can have reactive functionality such as a silanol, amino, glycidoxy, propyl, vinyl, acryloxy, isocyanato and/or mercapto functionality, among others. The silicon-containing material may, for example, comprise a silanol functional silicone such as a silicone functional silesquioxane as set for the above. The silicon-containing material may exclude siloxane gum, such as diorganopolysiloxane gum, such as one containing at least 2 alkenyl groups having 2 to 20 carbon atoms per molecule. The silicon-containing material may exclude a hydroxyl functional polysiloxane. The silicon-containing material can comprise a single silicone or a mixture of more than one silicone materials. For example, the silicon-containing material may comprise a silicone comprising at least one silicon-bonded hydrogen and a silicone comprising at least one ethylenically unsaturated group, such as is described in U.S. patent application Ser. No. 15/278,064.

Any suitable silane can be used for the silicon-containing material of the coating compositions according the present invention. A silane will be understood as referring to SiH$_4$ or any compound derived therefrom, such as by replacement of one or more of the H atoms through organic substituents. Particularly suitable are alkoxy silanes such as those that contain reactive functionality such as amino, glycidoxy, propyl, vinyl, acryloxy, isocyanato and/or mercapto functionality, among others. Amino silanes are particularly suitable, especially if the polyolefin contains acid functionality, and are commercially available from ShinEtsu as KBE-903, KBM-903, KBM603 and KBM602. The amino group of the silane may react with the acid functionality, if any, of the polyolefin to form an amide. Such amide formation may contribute to stabilization of the coating composition and may improve performance of the coating, particularly when applied to a can containing salty foods, such as chicken noodle soup. Oxirane containing silanes are also particularly suitable, such as KBM403 and KBM303 from ShinEtsu. The oxirane group may improve adhesion to the substrate and may also form an additional barrier against corrosion when applied to a can containing salty foods.

The amount of silicon-containing material in the coating composition according to the present invention, as noted above, is 5 wt % or greater, such as greater than 5.0 wt %, 10 wt % or greater, 15 wt % or greater or 20 wt % or greater, based on total solid weight of the coating composition. The amount of silicon-containing material in the coating composition can be greater than 50 wt %, such as 40 wt % or less or 25 wt % or less or 20 wt % or less, based on total solid weight of the coating composition. The amount of the silicon-containing material in the coating composition can be within any of the above limit values such as in a range of 5 wt % to 50 wt % or 10 wt % to 40 wt %, based on total solid weight of the composition. Thus the present coating compositions are distinct from coating compositions in which additive amounts (less than 5 wt %, such as 2 wt % or less or 1 wt % or less, based on total solid weight) of silicon (such as silane and/or silicone) are added as slip adds, adhesion promoters and the like. The amount of silicon-containing material may vary depending on the type of silicon-containing material used. For example, if a silicone resin is used, the amount can vary, such as 5.0 wt % or greater, greater than 5.0 wt %, 10 wt % or greater, 15 wt % or greater or 20 wt % or greater, and such as 40 wt % or lower or 25 wt % or lower or 20 wt % or lower, with wt % based on the total solids weight of the composition. A wt % of 5 to 25, or greater than 5 to 25, may be particularly suitable, such as 7.5 to 12.5. If a silane is used, the amount can vary, such as from 5.0 wt % or greater, greater than 5.0 wt %, 7.5 wt % or greater or 10 wt % or greater, to 25 wt % or lower, or 20 wt % or lower. A wt % of 5 to 15 may be particularly suitable, such as 6.0 to 12.5. Combinations of silicone and silane can also be used such as combining silane with silanol functionalized polysilicone resin, particularly branched or hyperbranched polysilicone resin. Di-alkoxy silanes or mono-alkoxy silanes can also be used, and they may help to improve stability in aqueous systems. The amounts of silicon-containing material in the present compositions as reported herein reflect the total weight of the entire silicon-containing material and not merely the weight of the silicon itself.

The coating composition may further comprise other polymeric components, such as acrylics, polyurethanes, polyureas, polyesters and the like. These optional other polymeric components are generally different from the polyolefin component and the silicon component. For example, the compositions according to the present invention can further comprise an acrylic resin. If used, such a polymeric component can comprise 2 wt % or greater, 5 wt % or greater, such as 10 wt % or greater or 20 wt % or greater wt %, with wt % based on the total solids weight of the coating composition and can comprise 60 wt % or lower, such as 50 wt % or lower, 40 wt % or lower, or 30 wt % or lower. The amount of polymer component in the coating composition can be used in any of the above limit values such as in a range of 2 wt % to 20 wt %, based on total solid weight of the composition.

It may be desirable to include a base material in the coating composition according to the present invention. Amines such as alkanol amines, dimethyl ethanol amine ("DMEA"), methyl diethanol amine, triethanol amine, and non-alkanol amines such as triethyl amine, tributyl amine, and ammonium hydroxide can, for example, be used as base. It will be appreciated that inclusion of such base material will increase the pH of the coating composition and may contribute to increased stability.

The coating composition may comprise a crosslinker in addition to any self condensation or self crosslinking contributed by the silicon component (depending on what silicon containing specie or species are used). Suitable crosslinkers can be chosen by those skilled in the art based upon the functionality of the other coating materials. Particularly suitable may be melamine based crosslinkers, such as CYMEL303 or CYMEL327, phenolics such as resole phenolics, particularly cresol resoles, such as PR516 from Allnex, novalak phenolics such as 29-008 from Direz, as well as blocked isocyante such as Bayer DESMODUR BL VPLS 2078/2, amine-terminated polyamide such as Momentive EPIKURE 3115, amides and ureas. A particularly suitable amide is hydroxyalkyl amide, such as those sold by EMS Griltech in their PRIMID line. A particularly suitable amine is a hydroxy functional alkyl polyurea, such as those described in PCT/US2017/013454 and PCT/US2017/013340. If used, the crosslinker can be present in an amount of 15 wt % or greater, such as 20 wt % or greater or 30 wt % or greater, or 40 wt % or lower, such as 35 wt % or lower or 25 wt % or lower, with wt % based on total solid weight of the coating composition.

The coating compositions of the present invention may be in the form of a solution or dispersion in a carrier medium.

The coating composition may thus comprise, e.g. as carrier medium, solvents that can include water and/or one or more organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50 wt % of the solvent is water. For example, less than 10 wt %, or even less than 5 wt % or 2 wt %, of the solvent can be water. It will be understood that mixtures of solvents, including or excluding water in an amount of less than 50 wt %, can constitute a "non-aqueous solvent". The solvent, if present in the composition of the present invention, may alternatively be aqueous or water-based. This means that 50 wt % or more of the solvent is water. These embodiments have less than 50 wt %, such as less than 20 wt %, less than 10 wt %, less than 5 wt % or less than 2 wt % of organic solvent in the solvent component or are essentially free of organic solvents; that is, less than 1 wt % of organic solvent.

The coating compositions may be in liquid form, such as a solution or dispersion in a carrier medium as described above, or in solid particulate form, i.e. a powder coating. Such coatings will be appreciated as being environmentally friendly, as only water is released on cure.

If desired, the coating compositions can comprise other optional materials well known in the art of formulating, such as colorants, plasticizers, abrasion resistant particles, antioxidants, hindered amine light stabilizers, UV light absorbers and stabilizers, surfactants, flow control agents, thixotropic agents, fillers, organic co-solvents, reactive diluents, catalysts, grind vehicles, slip agents, moisture scavenger and other customary auxiliaries.

As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; aluminum paste; aluminum powder such as aluminum flake; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 wt % of the present compositions, such as from 3 to 40% or 5 to 35 wt %, with wt % based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning. A wax can also be used such as polyolefin wax, carnauba wax, polytetrafluoroethylene ("PTFE"), Fischer Tropsch wax, or paraffin.

The coating compositions of the present invention may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

In addition, the compositions of the present invention may be substantially free, may be essentially free and/or may be completely free of formaldehyde and/or phenolic crosslinker, such as phenolic resin. The term "substantially free" as used in this context means the coating compositions contain less than 1000 parts per million (ppm), "essentially free" means less than 100 ppm and "completely free" means less than 100 parts per billion (ppb) of formaldehyde and/or phenolic compounds, derivatives or residues thereof. The compositions of the present invention may also be made without use of styrene, ethyl acrylate and/or n-butoxy methyl acrylamide monomers being intentionally introduced, although trace amounts of such materials added through contamination may be unavoidable.

As will be apparent from the above description and the below examples, the compositions of the present invention are coating compositions. They are not extrudable compositions that are used in the formation of plastics, injection molded plastics, rubber or the like. The polyolefin component and silicon component are blended together to form a coating composition and are not extruded together, melt processed together, vulcanized together or mixed by any similar procedure to form a composition that is not a coating composition. The polyolefin component and the silicon component (which comprises the silicon-containing material) are different components and different materials. They are not, for example, silicon-modified polyolefins.

The present compositions can be applied to any substrates known in the art, for example, automotive substrates, marine substrates, industrial substrates, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. The substrates to be coated such as any one of the aforementioned typed of substrates can be, for example, metallic or non-metallic. Metallic substrates can include tin, steel, tin-plated steel, chromium passivated steel, galvanized steel, aluminum, and aluminum foil. Metal sheet as used herein refers to flat metal sheet and coiled metal sheet, which is coiled, uncoiled for coating, and then re-coiled for shipment to a manufacturer. Non-metallic substrates include polymeric or plastic substrates, for example, polyester, polyolefin (e.g. polyprolylene, polyethylene or any other polyolefin materials as discussed above with respect to the polyolefin component), polyamide, cellulosic, polystyrene, polyacrylic, poly(ethylene naphthalate), nylon, EVOH, polylactic acid, other "green" polymeric substrates, poly(ethyleneterephthalate) ("PET"), polycarbonate, polycarbonate acrylobutadiene styrene ("PC/ABS"), wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

The compositions of the present invention can be applied by any means standard in the art, such as electro-coating, spraying, electrostatic spraying, dipping, rolling, brushing, and the like.

The compositions of the present invention can be applied to a dry film thickness of 0.04 mils to 40 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired. In some applications, a dry film thickness of 5-100 microns, such as 50-77 microns, is desired.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application. The present compositions can be thermoplastic or thermosetting.

The composition can be a clear coat. A clear coat will be understood as a coating that is substantially transparent or translucent. A clear coat can therefore have some degree of color, provided it does not make the clear coat opaque or otherwise affect, to any significant degree, the ability to see the underlying substrate. The clear coats of the present invention can be used, for example, in conjunction with a pigmented basecoat. The clear coat can be formulated as is known in the coatings art.

The composition may also comprise a colorant, such as a pigmented basecoat used in conjunction with a clear coat, or as a pigmented mono-coat. A suitable use of the present compositions is as a pigmented, two coat system where the first coat is not cured prior to application of the second coat; the two coats can then be cured together (and additional coats could also be applied both before and after cure). Such procedure is often referred to as a "wet-on-wet" process when the coatings are liquid, and "dust-on-dust" when the coatings are powder. The compositions of the present invention can be in one or both of the layers in the two coat system. Mixtures of compositions of the present invention are not limited to this application, and can be used according to any aspect of the invention.

Coatings as described herein are used in various industries to impart a decorative and/or protective finish. For example, such a coating or coating system may be applied to a vehicle. "Vehicle" is used herein in its broadest sense and includes all types of vehicles, such as but not limited to cars, trucks, buses, tractors, harvesters, heavy duty equipment, vans, golf carts, motorcycles, bicycles, railroad cars, airplanes, helicopters, boats of all sizes and the like. It will be appreciated that the portion of the vehicle that is coated according to the present invention may vary depending on why the coating is being used. For example, anti-chip primers may be applied to some of the portions of the vehicle. When used as a colored basecoat or mono-coat, the present coatings will typically be applied to those portions of the vehicle that are visible such as the roof, hood, doors trunk lid and the like, but may also be applied to other areas such as inside the trunk, inside the door and the like. The present compositions can also be applied to those portions of the vehicle that are in contact with the driver and/or passengers, such as the steering wheel, dashboard, gear shift, controls, door handle and the like. Clear coats will typically be applied to the exterior of a vehicle.

The compositions of the present invention are also in particular suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans (including beverage cans) and also specifically includes "can ends" including easy open ends, described above. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating composition of the present invention can be applied to at least a portion of a surface of the interior and/or the exterior of the package such as any type of package as described above. For example, the coating composition can be roll coated onto metal used to make a three-piece metal can, can end stock and/or cap/closure stock, or sprayed, flow coated or gravure or roll coated onto a formed two piece metal can. The coating composition may be applied to a coil or sheet by roll coating; the coating composition then be cured by radiation to form an at least partially cured coating and can ends be stamped out and fabricated into the finished product, such as can ends. The coating composition could also be applied as a rim coat to the bottom of the can; such application can be by roll coating. The rim coat functions to reduce friction for improved handling and protection during the continued fabrication and/or processing of the can. The coating composition can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating composition described herein, and the decorated, coated can stock used to form various metal cans. Metal coils, having wide application in many industries, are also substrates that can be coated according to the present invention. Coil coatings also typically comprise a colorant. Metal parts can also be coated according to the present invention. A metal part is a substrate made all or in part from metal that has been formed into a desired shape. Any of the substrates described herein can have sharp edges. "Sharp edge(s)" refers to edges that have been stamped, sheared, machine cut, laser cut and the like.

After application to the substrate, the coating composition may be cured by any appropriate means, for cure times and temperatures appropriate for the chemistry of the composition, the substrate being coated, and the like. In some applications a relatively low cure temperature for a relatively long time may be desired, such as a cure temperature of 100° C. to 140° C. for 60 minutes or less, such as 20 or 30 minutes. In other applications a relatively high cure temperature for a relatively short time may be desired, such as a cure temperature of 200° C. to 220° C. for a time of three minutes or less, such as two minutes or less. In other applications a cure time of five minutes +/−30 seconds, at 193° C.+/−10° C. may be desired. Accordingly, the present coatings can be used across a broad range of industries and cure conditions.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" composition comprising "a" polyolefin component, "a" silicon component, "a" silicon-containing material, "a" polymeric component, "a" base material, "a" solvent and the like, one or more of each of these and any other components can be used. As used herein, the term "polymer" refers to oligomers and both homopolymers and copolymers, and the prefix "poly" refers to two or more. Including, for example and like terms means including for example but not limited to. When ranges are given, any endpoints of those ranges and/or numbers within those ranges can be combined within the scope of the present invention.

The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the present invention include:
1. A coating composition comprising:
   a. a polyolefin component; and
   b. a silicon component; wherein the composition comprises 5.0 wt % or greater of a silicon-containing material where wt % is based on the total solids weight of the composition.
2. The coating composition of Aspect 1, wherein the composition comprises 5 wt % or greater than 5.0 wt % to 50 wt % of the silicon-containing material, based on the total solids weight of the composition.
3. The coating composition of Aspect 1 or 2, wherein the composition comprises 40 to 95 wt % of the polyolefin component, where wt % is based on the total solid weight of the composition.
4. The coating composition of any one of the preceding Aspects 1 to 3, further comprising an acrylic resin.
5. The coating composition of any one of the preceding Aspects 1 to 4, wherein the polyolefin component comprises an acid-functional polyolefin, optionally at least partly neutralized with a base.
6. The coating composition of Aspect 5, wherein the acid-functional polyolefin comprises an ethylene acrylic acid copolymer.
7. The coating composition of any one of the preceding Aspects 1 to 6, further comprising a base such as an amine.
8. The coating composition of any one of the preceding Aspects 1 to 7, wherein the silicon-containing material comprises a silicone, a silane or a combination thereof.
9. The coating composition of any one of the preceding Aspects 1 to 8, wherein the silicon-containing material comprises a silanol functional silicone, such as a silanol functional silsesquioxane silicone resin.
10. The coating composition of any one of the preceding Aspects 1 to 9, wherein the silicon-containing material comprises an amino silane.
11. The coating composition of any one of the preceding Aspects 1 to 10, further comprising a crosslinker.
12. The coating composition of Aspect 11, wherein the crosslinker comprises a hydroxyalkyl amide and/or a hydroxyl functional alkyl polyurea.
13. The coating composition of any one of the preceding Aspects 1 to 12 being in the form of a solution or dispersion in a carrier medium comprising water and/or one or more organic solvent or being in solid particulate form.
14. The coating composition of any one of the preceding Aspects 1 to 13, wherein the composition is substantially free of bisphenol A and derivatives or residues thereof.
15. The coating composition of any one of the preceding Aspects 1 to 14, wherein the composition does not include styrene, ethyl acrylate and/or n-butoxy methyl acrylamide or residues thereof.
16. A substrate coated at least in part with the coating composition of any one of the preceding Aspects 1 to 15.
17. The coated substrate of Aspect 16, wherein the substrate comprises a metallic substrate.
18. The coated substrate of any one of Aspects 16 or 17, wherein the substrate comprises a package.
19. The coated substrate of Aspect 18, wherein the package comprises a metal container such as a metal food or beverage can.
20. The coated substrate of Aspect 19, wherein the coating composition is applied to an interior surface of the metal container.

EXAMPLES

The following examples are intended to illustrate the invention and should not be construed as limiting the invention in any way.

Example 1

A coating composition of the present invention was made using the following:

| Ingredient | Amount (grams) | Resin solids (grams) | Wt % Resin solids |
|---|---|---|---|
| POD 5453 | 50 | 20 | 28.6 |
| 20% DMEA | 9 | — | — |
| Butyl Cellosolve | 15 | — | — |
| PRIMACOR solution | 50 | 10 | 14.2 |
| RSN233-Dispersion | 88.5 | 40 (20 silicon-containing material/20 acrylic) | 57.2 (28.6 silicon-containing material/28.6 acrylic) |
| DI water | 27 | — | — |

POD5453 from DOW
20% DMEA used was 20 wt % dimethylethanol amine 80 wt % DI water The PRIMACOR solution used in formulating the coating composition of Example 1 was made by providing 700 g of PRIMACOR 5980 I from DOW in solid form to a round bottom flask. Dimethylethanol amine (172 g) was added and then DI water (2627 g); subsequently the flask was heated to 100° C. until the PRIMACOR dissolved. The resulting solution had a resin solids content of 20 wt %. The RSN233—dispersion used in formulating the coating composition of Example 1 was made by dispersing RSN233 from DOW in and an acrylic resin ("Acrylic A") in an aqueous medium as described below.

Acrylic A (50 solids in butyl cellosolve) was prepared from the following ingredients (numbers are in grams).

| | |
|---|---|
| Styrene | 25 |
| Methacrylic acid | 20 |
| Ethyl acrylate | 55 |
| Butyl cellosolve | 100 |
| Total | 200 |

Acrylic A was prepared by charging the butyl cellosolve to a round bottom flask and heating to 136° C.; the monomers, to which 50% tert-butyl peroxyacetate was added at 2.45%, were added dropwise over 3 hours.

RSN233 water based silicone dispersion was made as follows (numbers are grams):

| | |
|---|---|
| Acrylic A in butyl cellosolve prepared as described above | 37.5 |
| Dimethyethanolamine | 1.2 |
| DI water | 18.0 |
| RSN233 @ 70 solids in butyl cellosolve | 27.0 |
| Total | 83.7 |

Acrylic A was put into a cowels tank and the blade speed was increased to 1000 RPM. The amine was added and mixed in, then the DI water was added and mixed until homogeneous. Finally the RSN solution was added and mixed until homogeneous.

The coating composition of Example 1 was prepared by loading the POD 5453 component into a cowels tank and turning the blade speed to 1000 RPM. The 20% DMEA, the butyl cellosolve and PRIMACOR solution were added and mixed until homogeneous. Then the RSN233 dispersion was added and mixed until homogeneous; the water was added to adjust viscosity and solids to 41.7% solids and a viscosity of 30 seconds using a #4 Ford cup.

Example 2

A coating composition of the present invention was made using the following:

| Ingredient | Amount (grams) | Resin solids (grams) | Wt % Resin solids |
|---|---|---|---|
| POD 5453 | 50 | 20 | 58.7 |
| 20% DMEA | 9 | — | — |
| Butyl Cellosolve | 15 | — | — |
| PRIMACOR solution | 50 | 10 | 29.4 |
| RSN255 dispersion | 9 | 4.0 (2.0 silicon-containing material/2.0 acrylic) | 11.9 (6.0 silicon-containing material/5.9 acrylic) |
| DI water | 75 | — | — |

The PRIMACOR solution was as used in Example 1. The RSN255 dispersion was made as described above for the RSN 233 dispersion, except for using RSN255 from Dow instead of RSN233 and using Acrylic B instead of Acrylic A. Acrylic B was made with methacrylic acid/ethyl methacrylate/methyl acrylate 30/35/35.

The coating composition of Example 2 was prepared from these ingredients according to the procedure of Example 1.

Example 3

A coating composition of the present invention was made using the following:

| Ingredient | Amount (grams) | Resin solids (grams) | Wt % Resin solids |
|---|---|---|---|
| POD 5453 | 50 | 20 | 78.7 |
| 20% DMEA | 9 | — | — |
| Butyl Cellosolve | 15 | — | — |
| RSN 255 dispersion | 12 | 5.4 (2.7 silicon-containing material/2.7 acrylic) | 21.3 (10.7 silicon-containing material/10.6 acrylic) |
| DI water | 27 | — | — |

The RSN255 dispersion used to formulate the coating composition of Example 3 was made as described above for the RSN 233 dispersion of Example 1 with Acrylic A except using RSN255. The coating composition of Example 3 was prepared from these ingredients according to the procedure of Example 1.

Example 4

A coating composition of the present invention was made using the following:

| Ingredient | Amount (grams) | Resin solids | % Resin solids |
|---|---|---|---|
| POD 5453 | 100 | 40 | 53.3 |
| 20% DMEA | 18 | — | — |
| Butanol | 30 | — | — |
| RSN 233 solid ground to <5 microns | 30 | 30 | 39.9 |
| DI water | 20 | — | — |
| PRIMID XL-552 30 solids in 3% DMEA | 17 | 5.1 | 6.8 |
| SURFYNOL 104 | 2 | — | — |
| Oleic acid | 2 | — | — |
| DI water | 42 | — | — |

PRIMID XL-552 EMS-GrilTech
SYRFYNOL 104 from Air Products

Example 4 was prepared as generally described above, with all of the ingredients in the table added sequentially.

Example 5

A coating composition of the present invention was made using the following:

| Ingredient | Amount (grams) | Resin solids | % Resin solids |
|---|---|---|---|
| POD 5453 | 100 | 40 | 92.6 |
| 20% DMEA | 18 | — | — |
| Butanol | 10 | — | — |
| KBM-603 aminosilane | 3.2 | 3.2 | 7.4 |
| SURFYNOL104 | 2 | — | — |
| Oleic acid | 2 | — | — |
| DI water | 20 | — | — |

Example 5 was prepared as generally described above for Example 4. The KBM-603 aminosilane was obtained from Shin-Etsu and added in place of the RSN.

Example 6 (Comparative Example)

A coating composition without a silicon component and using double the amount of POD as compared to Example 1 was made using the following:

| Ingredient | Amount (grams) | Resin solids | % Resin solids |
|---|---|---|---|
| POD 5453 | 100 | 40 | 80 |
| 20% DMEA | 9 | — | — |
| Butyl Cellosolve | 15 | — | — |
| PRIMACOR solution | 50 | 10 | 20 |
| DI water | 27 | — | — |

The coating composition of Example 6 was prepared from these ingredients following the procedure of Example 1.

Example 7

The coating compositions of Examples 1-6 were tested for solvent resistance, adhesion and blushing. The coating compositions of the above examples were applied to electro-coated tin plate by drawdown with an 18 RDS rod and cured for five minutes at 380° F. to a DFT of 18-22 mg/4 square inches. To test for MEK resistance, ASTM D5402-15 was used. Results are reported in double rubs and indicate the number of rubs the cured panel underwent prior to any metal exposure. To test for adhesion a cross-hatch adhesion test was run according to ASTM D3359-17. A result of "Pass" indicates 100% adhesion, while the result "pick-off" indicates removal of at least some of the coating. Blush was tested by and steam processing the panels for 60 minutes at 250° F. Blush was measured visually. If a coating turns white or milky white, the coating has undergone "Blush". As can be seen in the below table, the coatings of the present invention (examples 1-5) have superior results as compared to the coating lacking the silicon component (example 6).

| Example: | MEK double rubs: | X-hatch adhesion (post steam) | Steam process 60'@250° F. |
|---|---|---|---|
| 1 | 40 | Pass | No Blush |
| 2 | 15 | Pass | No Blush |
| 3 | 25 | Pass | No Blush |
| 4 | 40 | Pass | No Blush |
| 5 | 35 | Pass | No Blush |
| 6 | 10 | pick-off | Blush |

What is claimed is:

1. A coating composition comprising:
   a. 20 to 95 wt % of a polyolefin component, where wt % is based on the total solids weight of the composition and wherein the polyolefin component is introduced in the form of a dispersion;
   b. 5.0 wt % or greater of a silicon component, where wt % is based on the total solids weight of the composition; and
   c. 20 to 60 wt % of a polymeric component based on the total solids weight of the coating composition;
   wherein the polyolefin component comprises homopolymers and/or copolymers of polyethylene and/or polypropylene;
   wherein the polymeric component is different from the polyolefin component.

2. The coating composition of claim 1, wherein the composition comprises greater than 5.0 wt % of the silicon component, based on the total solids weight of the composition.

3. The coating composition of claim 1, wherein the composition comprises 5 to 50 wt % of the silicon component, based on the total solids weight of the composition.

4. The coating composition of claim 1, wherein the composition comprises greater than 5 up to 50 wt % of the silicon component, based on the total solids weight of the composition.

5. The coating composition of claim 1, wherein the composition comprises 25 to 95 wt % of the polyolefin component, where wt % is based on the total solid weight of the composition.

6. The coating composition of claim 1, wherein the polymeric component comprises an acrylic resin.

7. The coating composition of claim 6, wherein the coating composition further comprises an ethylene acrylic acid copolymer.

8. The coating composition of claim 1, wherein the silicon component comprises a silanol functional silsesquioxane silicone resin.

9. A substrate coated at least in part with the coating composition of claim 1.

10. The substrate of claim 9, wherein the substrate comprises a package.

11. The substrate of claim 10, wherein the package is a metal can.

12. The coating composition of claim 1, wherein the composition does not include styrene.

13. The coating composition of claim 1, wherein the composition does not include ethyl acrylate.

14. The coating composition of claim 1, wherein the composition does not include n-butoxy methyl acrylamide.

15. The coating composition of claim 1, wherein the composition is substantially free of bisphenol A and derivatives or residues thereof.

16. The coating composition of claim 1, further comprising a crosslinker.

17. The coating composition of claim 16, wherein the crosslinker comprises a hydroxyalkylamide.

18. The coating composition of claim 16, wherein the crosslinker comprises a hydroxyl functional alkyl polyurea.

19. The coating composition of claim 1, wherein the silicon-containing material does not comprise silicone gum.

20. The coating composition of claim 1, wherein the dispersion has a resin solids content in an amount of 40 wt % or greater.

21. The coating composition of claim 1, wherein further comprising a base.

22. The coating composition of claim 21, wherein the base may be selected from an amine, alkanol amines, dimethyl ethanol amine, methyl diethanol amine, triethanol amine, and non-alkanol amines such as triethyl amine, tributyl amine, or ammonium hydroxide.

* * * * *